May 17, 1966  J. J. E. MESNAGER  3,251,501
MOUNTING MEANS FOR TANKS
Filed Oct. 7, 1963  3 Sheets-Sheet 3
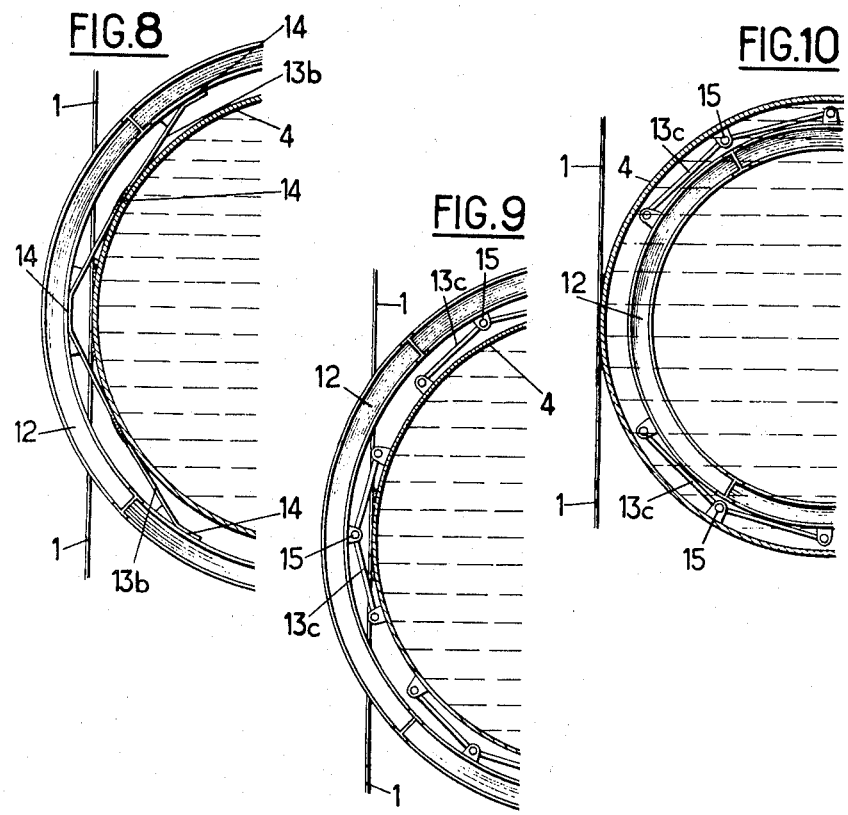
INVENTOR
J. J. E. Mesnager
By Holcombe, Vithrill Buchin
ATTORNEYS 3,251,501
MOUNTING MEANS FOR TANKS
Jacques Jean Emile Mesnager, Paris, France, assignor to Societe anonyme dite: Societe Anonyme des Ateliers & Chantiers de la Seine Maritime
Filed Oct. 7, 1963, Ser. No. 314,098
Claims priority, application France, Nov. 2, 1962, 914,234, Patent 1,350,691
1 Claim. (Cl. 220—15)

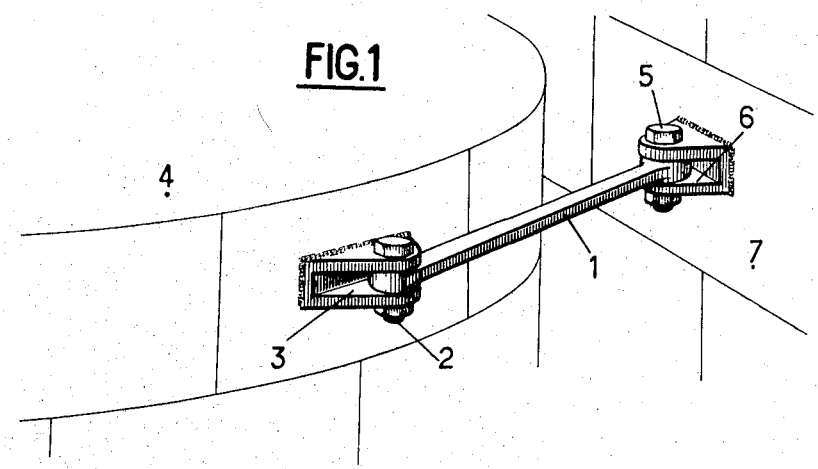
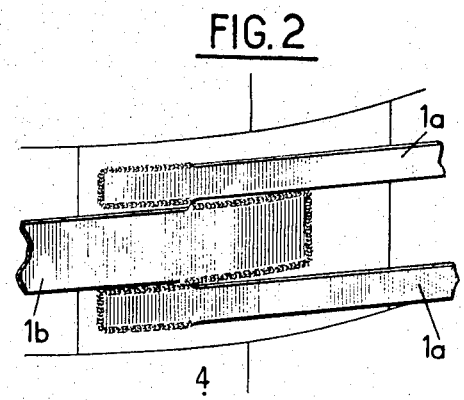
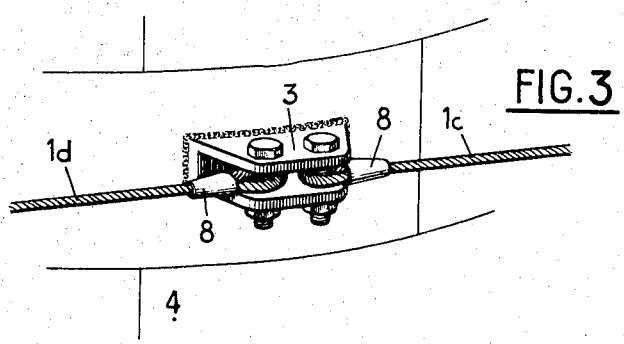

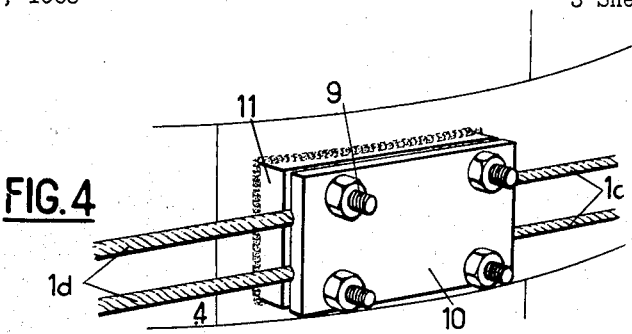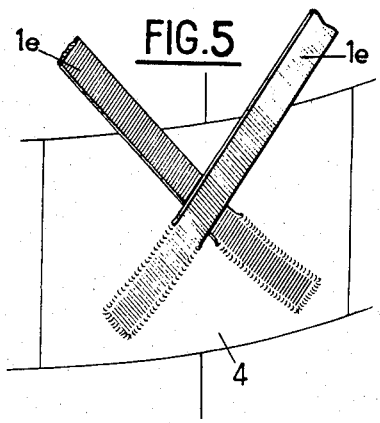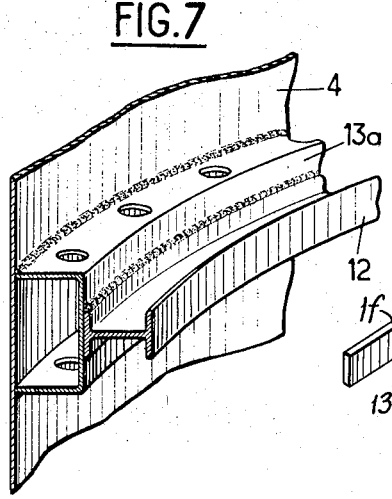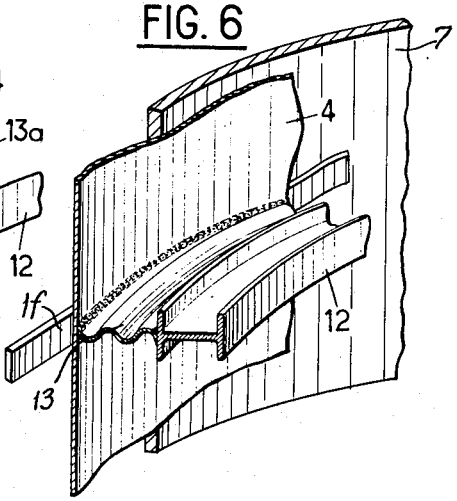

This invention relates to means for mounting a tank or other reservoir on a vehicle when it is expected that the tank will be subjected to sudden accelerations from various directions. The vehicle may be a truck, wagon, methane carrying ship, etc., and the mounting is such that it does not in itself distort the tank, yet permits it to expand and contract in response to variations in temperature, or during filling or emptying.

The mounting means according to the invention comprises yielding attaching means positioned in planes tangent to the tank and attached at one end to any suitable points on the vehicle. The attaching means may be connected at their other ends to the tank, preferably near the region which is subjected to the greatest shear stress, that is to say, in a horizontal diametral plane in the case of a horizontal tank, in a diametral plane having the greatest slope in the case of an inclined tank, or in a diametral plane perpendicular to the direction of the accelerations in the case of a vertical tank.

The invention also comprises, when necessary, means for reinforcing the tanks which may be positioned either inside or outside thereof near the points of attachment of the attaching means.

The yielding tangential attaching means hereinbefore mentioned may comprise rigid rods pivotally connected at their two ends to the tank and vehicle respectively, or flexible strips extending in opposite directions, or cables, as well as suitable combinations of these devices. The reinforcing means (considered separately or in combination with the yielding tangential attaching means) may comprise rigid annular girders attached to the wall of the tank by means of one or more flexible connections, or pivotally connected rigid members.

The present invention of course comprises both the yielding mounting means and the reinforcing means, taken separately or in combination, as well as tanks of any kind provided with such attaching and reinforcing means.

In order that the invention may be more readily understood, several embodiments thereof will now be described purely by way of illustration and example, in conjunction with the attached drawings.

In the drawings:
FIGURES 1, 2, 3, 4 and 5, are perspective views showing five embodiments of yielding and tangentially disposed attaching means according to the invention; and
FIGURES 6, 7, 8, 9 and 10 show schematically five reinforcing means for the tanks which may be advantageously used in association with the attaching means shown in FIGS. 1–5.

Referring now to the drawings, it will be seen that the yielding attaching means shown in FIGURE 1 consists of a rigid rod 1, one end of which is pivotally connected at 2 to a cradle 3 fixed to the tank 4 which is to be supported, while its other end is pivotally connected at 5 to a cradle 6 mounted on the vehicle 7.

In the embodiment of FIGURE 2, which is particularly useful in the case of tanks which are to be subjected to forces resulting from changes in direction, the attaching means comprises two flexible strips 1a extending in one direction and a third flexible strip 1b positioned between the first two strips and extending in the opposite direction.

In the embodiment shown in FIGURES 3 and 4, the attaching means comprises cables 1c, 1d, attached by means of thimbles 8 to a cradle 3 (FIGURE 3) or gripped between a plate 10 and a seat plate 11 welded to the tank 4 to which the plate 10 is attached by nuts and bolts 9.

It will, of course, be appreciated that the various attaching means hereinbefore described, which lie in planes perpendicular to the axis of the tank, may be supplemented by like attaching means disposed parallel to the generatrices of the tank to transmit forces in that direction.

Especially in the case of cylindrical tatnks having a vertical axis, the vertical and horizontal attaching means may be replaced by oblique attaching means, for example of the type shown at 1e in FIGURE 5, these oblique attaching means combining the roles of both the vertical and horizontal attaching means.

Such an arrangement is also applicable to inclined or horizontal tanks and, in all cases, enables them to resist forces acting in all directions.

In practice, if the tanks were provided only with yielding tangential attaching means according to the invention, more or less ovalization near their points of attachment would result. According to the invention, means are provided for avoiding such ovalization. One of these means comprises, for example, a rigid annular girder connected to the wall of the tank 4 and capable of resisting flexing torques engendered by the attaching means. Such a girder may be placed either inside or outside the tank. In the first case, it may advantageously consist of a web fixed to the wall of the tank, said webs being preferably corrugated as described in my French Patent No. 1,256,587.

When the attaching means are positioned near the ends of the tanks, the end walls may serve as the reinforcing webs. FIGURES 6, 7, 8, 9 and 10 show other embodiments of the aforesaid girder.

In the case of FIGURE 6, the girder indicated by reference numeral 12 is positioned inside the tank 4. It is connected to the tank wall by means of a flexible membrane 13. This flexible membrane 13 transmits only tangential forces, leaving the wall of the tank free to assume whatever radius of curvature may be imposed by radial pressure and changes in temperature. The tank is connected to the vehicle 7 by flexible attaching means 1f.

On FIGURE 7 the annular girder 12 is connected to the wall of the tank by means of a channel member 13a having flexible walls, the size of which may vary in proportion to the radius of the tank. The connection between the annular girder 12 and the tank is assured by the shear stresses transmitted by the wall of the channel member. The moment of inertia of the annular girder is thus increased by that of the wall of the tank which is held to the girder by the said shear stresses.

In the embodiment shown on FIGURE 8, the annular girder is positioned outside the tank 4. The girder is connected to the tank by flexible strips 13b welded at 14.

On FIGURE 9 this connection is made by means of rods 13c pivotally attached at one end to the tank 4 and at the other end at 15 to the annular girder. Finally on FIGURE 10, the annular girder is mounted inside the tank 4, and is connected thereto by the same device as that shown in FIGURE 9.

It should be noted that all of the devices described in the present specification are perfectly suited to solve the problems of mounting those tanks which are installed on board ships for transporting liquid cargoes at very low temperature.

The embodiments of the invention which have been described have been given purely by way of example and may be modified as to detail without thereby departing from the spirit of the invention as defined by the following claim.

What is claimed is:

In combination, a tank having a cylindrical wall portion and comprising at least one annular reinforcing girder lying in a plane perpendicular to the longitudinal axis of said cylindrical wall portion and connected to said cylindrical wall portion by a ring of flexible corrugated metal, a vehicle at least partly encircling said tank, and means for mounting said tank on said vehicle, said mounting means comprising a plurality of attaching members each having an outer end connected to said vehicle and an inner end connected to a part of said cylindrical wall portion to which said girder is connected, said attaching members lying in planes substantially tangent to the cylindrical wall portions of said tank to which they are connected and being mounted to permit their inner ends to swing toward and away from said vehicle.

References Cited by the Examiner

UNITED STATES PATENTS

| 1,948,477 | 2/1934 | Zenner | 220—15 |
| 2,467,428 | 4/1949 | Hansen et al. | 220—15 |
| 2,592,974 | 4/1952 | Sulfrian | 220—15 |
| 2,814,410 | 11/1957 | Hansen | 220—15 |
| 2,818,191 | 12/1957 | Arne | 220—1 |
| 2,863,297 | 12/1958 | Johnston | 220—9 |
| 2,926,810 | 3/1960 | Yeager | 220—15 |
| 3,004,683 | 10/1961 | Buchhold | 220—15 |
| 3,021,027 | 2/1962 | Claxton | 220—15 |
| 3,078,004 | 2/1963 | Randolf | 220—15 |
| 3,115,983 | 12/1963 | Wissmiller | 220—15 |
| 3,155,265 | 11/1964 | Reese | 220—15 |

THERON E. CONDON, *Primary Examiner.*

R. A. JENSEN, J. R. GARRETT, *Assistant Examiners.*